United States Patent
Xiao et al.

(10) Patent No.: US 12,255,843 B2
(45) Date of Patent: Mar. 18, 2025

(54) PHYSICAL CHANNEL TRANSMISSION METHOD, APPARATUS, AND NODE, AND STORAGE MEDIUM

(71) Applicant: ZTE Corporation, Shenzhen (CN)

(72) Inventors: Huahua Xiao, Shenzhen (CN); Zhaohua Lu, Shenzhen (CN); Chuangxin Jiang, Shenzhen (CN); Shujuan Zhang, Shenzhen (CN); Shijia Shao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 314 days.

(21) Appl. No.: 17/786,431

(22) PCT Filed: Dec. 28, 2020

(86) PCT No.: PCT/CN2020/140007
§ 371 (c)(1),
(2) Date: Jun. 16, 2022

(87) PCT Pub. No.: WO2021/136152
PCT Pub. Date: Jul. 8, 2021

(65) Prior Publication Data
US 2023/0021652 A1      Jan. 26, 2023

(30) Foreign Application Priority Data
Dec. 31, 2019   (CN) ................ 201911418751.4

(51) Int. Cl.
*H04L 5/00*   (2006.01)
*H04L 1/08*   (2006.01)
(52) U.S. Cl.
CPC .............. *H04L 5/0053* (2013.01); *H04L 1/08* (2013.01)

(58) Field of Classification Search
CPC ......... H04L 1/08; H04L 1/189; H04L 5/0048; H04L 5/0053; H04L 5/0094
See application file for complete search history.

(56) References Cited

U.S. PATENT DOCUMENTS

| | | | |
|---|---|---|---|
| 2015/0215085 A1 | 7/2015 | Xu et al. | |
| 2015/0304080 A1* | 10/2015 | Yi | H04L 5/0053 370/329 |
| 2016/0105264 A1 | 4/2016 | Chen et al. | |

FOREIGN PATENT DOCUMENTS

| | | |
|---|---|---|
| CN | 109257958 A | 1/2019 |
| CN | 109936429 A | 6/2019 |

(Continued)

OTHER PUBLICATIONS

Examination Report for Indian Patent Application No. 202227037405, dated Nov. 2, 2022.

(Continued)

*Primary Examiner* — Phuc H Tran
(74) *Attorney, Agent, or Firm* — Wolf, Greenfield & Sacks, P.C.

(57) ABSTRACT

A physical channel transmission method and apparatus, a node and a non-transitory computer-readable storage medium. The physical channel transmission method may include: acquiring, by a transmitter, K copies of reference signal parameters, the K copies of reference signal parameters being used for N repetitive transmissions of a physical channel, where the K and N are integers greater than 1 and the N is greater than or equal to K; and performing, by the transmitter, repetitive transmissions of the physical channel according to the K copies of reference signal parameters.

20 Claims, 2 Drawing Sheets

Acquire K copies of reference signal parameters by a transmitter — S101

Perform, by the transmitter, repetitive transmissions of a physical channel according to the K copies of reference signal parameters — S102

(56) References Cited

FOREIGN PATENT DOCUMENTS

| CN | 110536399 A | 12/2019 | |
|----|----|----|----|
| CN | 111342938 A | 6/2020 | |
| WO | WO 2012/036787 A2 | 3/2012 | |
| WO | WO-2018128064 A1 * | 7/2018 | ........... H04B 7/0695 |
| WO | WO 2018/205984 A1 | 11/2018 | |
| WO | WO-2020030182 A1 * | 2/2020 | ........... H04L 5/0048 |
| WO | WO-2020091973 A1 * | 5/2020 | ........... H04L 1/0006 |

OTHER PUBLICATIONS

International Search Report and Written Opinion for International Application No. PCT/CN2020/140007, mailed Mar. 30, 2021.
[No Author Listed] UL grant-free transmission for URLLC, Agenda Item 5.1.3.3.3. China Telecom, 3GPP TSG RAN WG1 NR Ad-Hoc#2. Jun. 30, 2017:1-4.
First Examination Report for Australian Patent Application No. 2020416372, dated Jul. 11, 2023.
Third Examination Report for Australian Patent Application No. 2020416372, dated Oct. 23, 2023.
Second Office Action for Chinese Application No. 201911418751.4, dated Mar. 28, 2024.

\* cited by examiner

PHYSICAL CHANNEL TRANSMISSION METHOD, APPARATUS, AND NODE, AND STORAGE MEDIUM

CROSS-REFERENCE TO RELATED APPLICATION

This application is a national stage filing under 35 U.S.C. § 371 of international application number PCT/CN2020/140007, filed Dec. 28, 2020, which claims priority to Chinese patent application No. 201911418751.4 filed Dec. 31, 2019. The contents of these applications are incorporated herein by reference in their entirety.

TECHNICAL FIELD

The present disclosure relates to the technical field of communication, for example, to a physical channel transmission method and apparatus, a node and a non-transitory computer-readable storage medium.

BACKGROUND

As a technology to effectively improve the transmission reliability, repetitive transmission is widely adopted in wireless communication systems. For example, the reliability of the Ultra-reliable and Low Latency Communications (URLLC), the massive Machine Type of Communication (mMTC) or the like is improved through repetitive transmission.

As an important technology in the field of wireless communication, the joint transmission or reception of Multiple Transmission and Reception Point (Multi-TRP) has a remarkable effect on increasing the throughput of wireless communication. Therefore, the Multi-TRP transmission is supported in Long Term Evolution (LTE), Long Term Evolution-Advanced (LTE-A), New Radio access technology (NR) and other standards. As an important technology introduced by NR, Multi-Panel transmission is mainly to mount multiple antenna panels at a receiver and/or a transmitter to improve the spectrum efficiency of wireless communication systems.

In the existing technology, the repetitive transmission technology can also be adopted in Multi-TRP or Multi-Panel to improve the reliability of transmission, but the repetitive transmission technology will occupy resources for N times during N transmissions.

SUMMARY

In order to solve at least one of the above technical problems, according to embodiments of the present disclosure following schemes are provided.

According to an embodiment of the present disclosure provided is a physical channel transmission method. The method may include:
  acquiring, by a transmitter, K copies of reference signal parameters, the K copies of reference signal parameters being used for N repetitive transmissions of a physical channel;
  where the K and N are integers greater than 1 and the N is greater than or equal to K; and
  performing, by the transmitter, repetitive transmissions of the physical channel according to the K copies of reference signal parameters.

According to another embodiment of the present disclosure provided is a physical channel transmission method. The method may include:
  acquiring, by a receiver, K copies of reference signal parameters, the K copies of reference signal parameters being used for receiving N repetitive transmissions of a physical channel;
  where the K and N are integers greater than 1 and the N is greater than or equal to K; and
  receiving, by the receiver, repetitive transmissions of the physical channel according to the K copies of reference signal parameters.

According to yet another embodiment of the present disclosure provided is a transmitting apparatus. The apparatus may include an acquisition module and a communication module.

The acquisition module is configured to acquire K copies of reference signal parameters, the K copies of reference signal parameters being used for N repetitive transmissions of a physical channel; where the K and N are integers greater than 1 and the N is greater than or equal to K.

The communication module is configured to perform repetitive transmissions of the physical channel according to the K copies of reference signal parameters.

According to yet another embodiment of the present disclosure provided is a receiving apparatus. The apparatus may include an acquisition module and a communication module.

The acquisition module configured to acquire K copies of reference signal parameters, the K copies of reference signal parameters being used for receiving N repetitive transmissions of a physical channel; where the K and N are integers greater than 1 and the N is greater than or equal to K.

The communication module configured to receive repetitive transmissions of the physical channel according to the K copies of reference signal parameters.

According to yet another embodiment of the present disclosure provided is a node. The node may include a memory, a processor and computer programs that are stored on the memory and executable by the processor. The computer programs, when executed by the processor, cause the processor to carry out the physical channel transmission method according to any one of the embodiments of the present disclosure.

According to yet another embodiment of the present disclosure provided is a non-transitory computer-readable storage medium having computer programs stored thereon. The computer programs, when executed by a processor, cause the processor to carry out the physical channel transmission method according to any one of the embodiments of the present disclosure.

More descriptions of the above embodiments and other aspects of the present disclosure and the implementations thereof will be provided in the brief description of drawings, the detailed description and the claims.

DETAILED DESCRIPTION

The embodiments of the present disclosure will be described in detail below with reference to the accompanying drawings. It is to be noted that the embodiments in the present disclosure and the features in the embodiments can be arbitrarily combined with each other if not conflicted.

In addition, in the embodiments of the present disclosure, the terms "optionally" or "exemplarily" are used to indicate examples, illustrations or explanations. Any embodiment or design scheme described as "optionally" or "exemplarily" in the embodiments of the present disclosure should not be interpreted as being more preferable or advantageous than other embodiments or design schemes.

In the embodiments of the present disclosure, one panel corresponds to one port group (e.g., antenna port group or antenna group), the panels are in a one-to-one correspondence to the port groups, and the panels and the port groups can be replaced with each other. The panels can also be replaced with spatial parameters. Further, the panels may refer to antenna panels, and a TRP or receiver may include at least one antenna panel. Each panel has one or more antenna arrays, and multiple antenna arrays may be virtualized as an antenna port. The antenna ports on one panel can be divided into a port group. In addition, one panel may also be divided into multiple sub-panels, and the multiple antenna ports included in each sub-panel may also be divided into a port group. By taking dual-polarized antennas as an example, the antenna polarized at positive 45° is one sub-panel, and the antenna polarized at negative 45° is the other sub-panel. In the embodiments of the present disclosure, panels and sub-panels are collectively referred to as panels.

During transmission of data or signaling, physical channels in standards are usually classified into Physical Downlink Control Channels (PDCCHs), Physical Uplink Control Channels (PUCCHs), Physical Downlink Shared Channels (PDSCHs) and Physical Uplink Shared Channels (PUSCHs). PHCCHs are mainly used to transmit Downlink Control Information (DCI). PUCCHs are mainly used to transmit uplink control information, for example, Channel State Information (CSI), Hybrid Automatic Repeat Requests (HARQs), scheduling requests and the like. PDSCHs are mainly used to transmit downlink data. PUSCHs are mainly used to transmit uplink data, CSI and other information. Further, PDCCHs and PUCCHs may be collectively referred to as physical control channels, and PUSCHs and PDSCHs may be collectively referred to as physical shared channels.

The CSI includes channel state information of downlink fed back by the receiver and channel state information of uplink of the receiver indicated by the transmitter. The channel state information of downlink includes, but not limited to, one of CSI-RS Resource Indicator (CRI), Synchronization Signals Block Resource Indicator (SSBRI), channel Quality Indicator (CQI), Precoding Matrix Indicator (PMI), Layer Indicator (LI), Rank Indicator (RI). The channel state information of uplink includes, but not limited to, one of uplink SRS Resource Indicator (SRI), Transmitted Precoding Matrix Indicator (TPMI), Transmitted Rank Indicator (TRI), and Modulation and Coding Scheme (MCS). In addition, the TPMI and the TRI may be coded jointly, and are indicated by precoding information and number of layers of the downlink control signaling.

During repetitive transmission of data, for example, the repetitive transmission of M (M is an integer greater than 1) PHSCHs or PUSCHs means that the M pieces of data transmitted repetitively carry exactly the same information. For example, the M pieces of data come from the same Transport Block (TB), but the corresponding Redundancy Versions (RVs) after channel coding are different; or even, the RVs of the M pieces of data after channel coding are the same, or the same RV of information of the same transport block is divided into different layers for transmission. The RV refers to different redundancy versions of the transmitted data after channel coding, and can be generally classified into channel versions {0, 1, 2, 3}. Similarly, the repetitive transmission of signaling (for example, repetitive transmission of PDCCHs or PUCCHs) means that the DCI carried by M pieces of signaling transmitted repetitively have the same contents. For example, the DCI carried by M PDCCHs have the same contents (for example, the value of each domain is the same), or the contents carried by M PUCCHs have the same value.

M pieces of data or signaling transmitted repetitively may come from M different TRPs, or M different antenna panels, or M different Bandwidth Parts (BWPs), or M different Carrier Components (CCs), where M panels or BMPs or CCs may belong to a same TRP or multiple TRPs. M pieces of data or signaling transmitted repetitively may only come from different transmission slots or sub slots of a same transmission node. Further, the repetitive transmission scheme includes, but not limited to, at least one of space division multiplexing scheme 1, frequency division multiplexing scheme 2, intra-slot time division multiplexing scheme 3 and inter-slot time division multiplexing scheme 4. Depending on whether the RVs of transport blocks are the same, Scheme 2 may be further divided into two categories. When the RVs corresponding to the repetitively transmitted data are the same or the repetitively transmitted data comes from different layers of a same transport block, Scheme 2a is adopted; and, when the RVs corresponding to the repetitively transmitted data are different, Scheme 2b is adopted.

Any combination of the above multiplexing schemes is also possible, for example, the combination of space division multiplexing and frequency division multiplexing, the combination of time division multiplexing and frequency division multiplexing, etc. In addition, the slot refers to a set including L symbols, and the sub slot refers to a set including K1 symbols. Generally, K1 is a positive integer less than or equal to L. L may be 14 or 12, and K1 may be any value from 2 to 13, or 2, 4, or 7.

In addition, a PDCCH needs to be mapped to a group of Resource Elements (REs), where one Control Channel Element (CCE) may include a plurality of REs, and one RE includes one sub-carrier in frequency domain and one symbol in time domain. A set of one or more CCEs used to transmit the PDCCH may be referred to as a Control Resource Set (CORESET), which includes a plurality of physical resource blocks in frequency domain and K2 symbols in time domain, where K2 is a natural number. For example, K2 may be an integer of 1, 2 or 3. Here, the symbol may include, but not limited to, one of Orthogonal Frequency Division Multiplex (OFDM), Single-Carrier Frequency Division Multiple Access (SC-FDMA), and Orthogonal Frequency Division multiple access (OFDMA).

In order to transmit a PUSCH or a PDSCH, a set of REs of K3 consecutive symbols and L1 frequency-domain sub-carriers may form a resource block (RB), which is also referred to as a physical resource block (PRB), where both K1 and L1 are positive integers. For example, K3=12 or 14, and L1=12.

Physical channels such as PDSCHs, PDCCHs, PUSCHs and PUCCHs are all modulated in minimum resource elements (REs), and each RE includes one symbol in time domain and one sub-carrier in frequency domain. In order to demodulate or acquire the information (including data or signals) carried by the physical channel modulated in the REs, it is necessary to estimate the value of a wireless channel on the REs. This value can generally be estimated by a Demodulation Reference Signal (DMRS), and the information on the physical channel is obtained by channel interpolation on the RE corresponding to the DMRS.

In addition, in the embodiments of the present disclosure, unless otherwise specified, one receiver and at least one TRP are generally included. In order to improve the reliability of transmitted data or signaling, the transmitter repetitively transmits the data or signaling for N times, for example, repetitively transmitting at least one of the PDSCH, PUSCH, PDCCH and PUCCH for N times. In the downlink, the transmitter may be various network-side equipment, such as various transmission nodes, macro transmitters, micro transmitters, pico-transmitters, relays or other network-side equipment; while in the uplink, the transmitter may be mobile phones, portable devices, computers, data cards or other receivers. Correspondingly, the receiver may be a receiver in the downlink, and may be a network-side equipment in the uplink. The data or signaling that is repetitively transmitted for N times may come from a same transmitter or different transmitters, or may come from different panels of a same transmitter or different transmitters. The N pieces of data or signaling that is repetitively transmitted may be transmitted through space division multiplexing, frequency division multiplexing or time division multiplexing.

In the embodiments of the present disclosure, the reference signal may include, but not limited to, at least one of: DMRS, Channel State Information-Reference Signal (CSI-RS) resource, Synchronization Signals Block (SSB) resource, Physical Broadcast Channel (PBCH) resource, SSB/PBCH resource, Sounding Reference Signal (SRS) resource, Positioning Reference Signal (PRS), Phase-Tracking Reference Signal (PTRS). After the receiver or transmitter receives a transport block, if the reception is correct upon detection, an Acknowledgement (ACK) message is fed back; otherwise, a Negative Acknowledgement (NACK) message is fed back. The transmitter may not feed back the NACK message, and does not schedule or allocate resources to inform the receiver that subsequent transmission of the PUSCH is not required.

In the embodiments of the present disclosure, the density of the reference signal means a proportion of REs used to transmit the reference signal in all transmission resources, or a proportion of REs in an RB used to transmit the reference signal in the whole RB.

In the embodiment, the spatial parameter includes, but not limited to, transmitting beam, receiving beam, quasi co-location type D, transmitting beam group, receiving beam group, RF beam, spatial Rx parameter, Transmission Configuration Indication (TCI), beam index, beam index group, partial parameter information indication in quasi co-location and the like.

In the embodiments of the present disclosure, the transmission may be any one of transmitting or receiving. For a downlink channel (e.g., PDCCH or PDSCH), the transmitter may be construed as various network-side equipment (e.g., base stations), and the receiver may be construed as a terminal; while for an uplink channel (e.g., PUCCH or PUSCH), the transmitter may be construed as a terminal, and the receiver may be construed as various network-side equipment. Thus, the transmitter repetitively transmitting a certain piece of data or signaling may mean that the transmitter repetitively transmits a certain piece of data or signaling to the receiver; and correspondingly, the receiver receives the certain piece of data or signaling repetitively transmitted by the transmitter.

Figure 1:
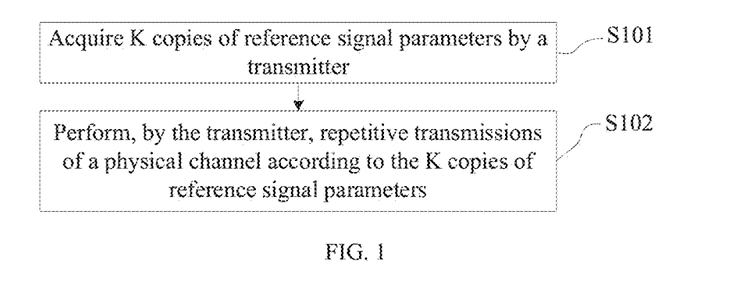
FIG. 1 is a flowchart of a physical channel transmission method according to an embodiment.

Based on the above concepts, FIG. 1 shows a flowchart of a physical channel transmission method according to an embodiment of the present disclosure. As shown in FIG. 1, the method may be applied to a transmitter and may include steps S101 to S102.

At S101, a transmitter acquires K copies of reference signal parameters.

The K copies of reference signal parameters can be used for N repetitive transmissions of a physical channel, where K and N are integers greater than 1, and N is greater than or equal to K. The reference signal parameters may include at least one of the number of resource elements of a reference signal, a density of the reference signal, the number of symbols of the reference signal and a transmission power of the reference signal. Further, the configuration of the reference signal parameters may also include a pattern of the reference signal, a power offset of the reference signal, a transmission type of the PUSCH, whether frequency hopping occurs in the PUSCH, a transmission type of the PUCCH, whether frequency hopping occurs in the PUCCH or the like. The pattern of the reference signal may include the number of REs occupied by the reference signal in one RB, the number of combs, the density of REs or the like. The transmission power or power offset is an increase relative to one of the following: data, SSB/PBCH, and Channel State Information-Reference Signal (CSI-RS).

The N repetitive transmissions may be divided into K groups, and each group of repetitive transmissions uses the same reference signal parameters, for example, including n1 repetitive transmissions having consecutive repetitive transmission indexes. Here, n1 is a positive integer. For example, n1=f(N/K), where f represents up-rounding or down-rounding of a real number, and N/K represents the division of N by K. If N is not divisible by K, when f is up-rounding, some groups of repetitive transmissions may include n1−1 repetitive transmissions; and when f is down-rounding, some groups of repetitive transmissions may include n1+1 repetitive transmissions. An $i^{th}$ group of repetitive transmissions corresponds to an $i^{th}$ copy of reference signal parameters, where i=1, . . . , K.

The K copies of reference signal parameters correspond to M pieces of spatial parameter information, and/or the N repetitive transmissions of the physical channel correspond to M pieces of spatial parameter information, where M is a positive integer greater than or equal to K but less than or equal to N. In an embodiment, M spatial parameters may be divided into K groups, and each group of spatial parameters corresponds to one copy of reference signal parameters. Each group of spatial parameter information includes n2 pieces of spatial parameter information. Here, n2 is a positive integer. For example, n2=f(M/K), where f represents up-rounding or down-rounding of a real number, and M/K represents the division of M by K. If M is not divisible by K, when f is up-rounding, some groups of repetitive transmissions may include n2−1 repetitive transmissions; and when f is down-rounding, some groups of repetitive transmissions may include n2+1 repetitive transmissions.

The K copies of reference signal parameters acquired by the transmitter may be parameters preconfigured by the transmitter, or parameters acquired by the transmitter through a high-layer signaling. The K copies of reference signal parameters preconfigured by the transmitter may be construed as K copies of reference signal parameters configured by agreement between the transmitter and the receiver. The K copies of reference signal parameters acquired through a high-layer signaling (e.g., Radio Resource Control (RRC), Medium Access Control Control Element (MAC CE) or physical layer signaling) may be construed as K copies of reference signal parameters configured by the transmitter through a high-layer signaling or K copies of reference signal parameters transmitted by other nodes and received through a high-layer signaling or physical layer.

In an embodiment, when the transmitter is a network-side equipment, the transmitter may configure K copies of reference signal parameters through a high-layer signaling and transmit the K copies of reference signal parameters to the receiver through a high-layer signaling or physical layer signaling. When the transmitter is a terminal, the transmitter may acquire K copes of reference signal parameters transmitted by other nodes (e.g., network-side equipment) through a high-layer signaling or physical layer signaling.

The transmitter may preconfigure some reference signal parameters in the K copies of reference signal parameters. For example, it is assumed that k copies of reference signal parameters are preconfigured by the transmitter and the other K−k copies of reference signal parameters are acquired through a high-layer signaling. For example, k copies of reference signal parameters are acquired by agreement according to k=1 copy of reference signal parameters, and the other K−k copies of reference signal parameter configurations are acquired in such a manner that the number of symbols of the reference signal may be gradually increased. A symbol index position of the reference signal with increased number of symbols may also be acquired through pre-configuration.

At S102, the transmitter performs repetitive transmissions of the physical channel according to the K copies of reference signal parameters.

Based on S101, after the transmitter acquires the K copies of reference signal parameters, since the K copies of reference signal parameters are used for N repetitive transmissions of the physical channel, when another node (e.g., a receiver) receives a $j^{th}$ repetitive transmission during the N repetitive transmissions performed by the transmitter, the transmitter may combine the information obtained by repetitive transmissions in a quantity that is less than or equal to j to obtain a combined gain, and feed back an ACK message after a successful demodulation, thereby avoiding the occupation of excessive resources for repetitive transmissions and ensuring the reliability of transmission. In accordance with the physical channel transmission method provided in the embodiment, during repetitive transmissions, the demodulation performance of repetitive transmissions can be improved.

In an example, the repetitive transmission way at S102 may be at least one of the following: way 1: the number of symbols of the reference signal corresponding to the $j^{th}$ repetitive transmission by the transmitter is greater than or equal to the number of symbols of the reference signal corresponding to the $i^{th}$ repetitive transmission by the transmitter, where $1≤i<j≤N$; way 2: the transmission power of the reference signal corresponding to the $i^{th}$ repetitive transmission by the transmitter is greater than or equal to the transmission power of the reference signal corresponding to the $i^{th}$ repetitive transmission by the transmitter, where $1≤i<j≤N$; way 3: the number of resource elements of the reference signal corresponding to the $i^{th}$ repetitive transmission by the transmitter is greater than or equal to the number of resource elements of the reference signal corresponding to the $i^{th}$ repetitive transmission by the transmitter, where $1≤i<j≤N$; and, way 4: the density of the reference signal corresponding to the $j^{th}$ repetitive transmission by the transmitter is greater than or equal to the density of the reference signal corresponding to the $i^{th}$ repetitive transmission by the transmitter, where $1≤i<j≤N$.

The repetitive transmission way at S102 may further include at least one of the following situations: situation 1: when the number of resource symbols corresponding to repetitive transmissions is greater than L, the number of symbols of the reference signal corresponding to the $j^{th}$ repetitive transmission by the transmitter is greater than or equal to the number of symbols of the reference signal corresponding to the $i^{th}$ repetitive transmission by the transmitter, where L is an integer greater than 1 and $1≤i<j≤N$; situation 2: after an $n^{th}$ repetitive transmission, the transmission power of the reference signal corresponding to the $i^{th}$ repetitive transmission by the transmitter is greater than or equal to the transmission power of the reference signal corresponding to the $i^{th}$ repetitive transmission by the transmitter, where $1<n≤j$ and $1≤i<j≤N$; and, situation 3: after an $m^{th}$ repetitive transmission by the transmitter is successful, the repetitive transmission is terminated, where m is greater than k, and $1<k<N$. That is, after a certain repetitive transmission by the transmitter is successful, and when the number of this repetitive transmission does not reach a total number of repetitive transmissions, the repetitive transmission may be terminated.

When the physical channel is a PDSCH or a PUSCH, and when the number of resource symbols corresponding to repetitive transmissions by the transmitter is greater than L, the value of L may be an integer greater than 7. Further, when the transmission type of the PDSCH is A, the value of L may be 8; and, when the transmission type of the PDSCH is B, the value of L may be 7. When no frequency hopping occurs and if the transmission type of the PUSCH is A, the value of L may be 8; or otherwise, the value of L is 7. When frequency hopping occurs, the value of K is 5. When the physical channel is a PUCCH, and when the number of resource symbols corresponding to repetitive transmissions by the transmitter is greater than L, the value of L may be an integer greater than 2.

In another embodiment, at S102, the performing, by the transmitter, repetitive transmissions of the physical channel according to the K copies of reference signal parameters may be the case where: the number of symbols of the reference signal corresponding to the $j^{th}$ repetitive transmission by the transmitter is less than the number of symbols of the reference signal corresponding to the $i^{th}$ repetitive transmission by the transmitter, where $1≤i<j≤N$; or, when the number of resource symbols corresponding to repetitive transmissions is greater than L, the number of symbols of the reference signal corresponding to the $j^{th}$ repetitive transmission by the transmitter is less than the number of symbols of the reference signal corresponding to the $i^{th}$ repetitive transmission by the transmitter, where L is an integer greater than 1 and $1≤i<j≤N$; or, the number of resource elements of the reference signal corresponding to the $j^{th}$ repetitive transmission by the transmitter is less than the number of resource elements of the reference signal corresponding to the $i^{th}$ repetitive transmission by the transmitter, where $1≤i<j≤N$;

or, the density of the reference signal corresponding to the $j^{th}$ repetitive transmission by the transmitter is less than the density of the reference signal corresponding to the $i^{th}$ repetitive transmission by the transmitter, where $1 \leq i < j \leq N$.

Thus, by continuously reducing the overhead for modulation of the reference signal, a coding rate of the channel is increased, and the accuracy of demodulation is improved.

In another example, when the physical channel is a physical shared channel, at S102, the performing, by the transmitter, repetitive transmissions of the physical channel may be at least one of the following: way 1: a modulation coding order corresponding to the shared data corresponding to the $i^{th}$ repetitive transmission by the transmitter is greater than a modulation coding order corresponding to the shared data corresponding to the $i^{th}$ repetitive transmission by the transmitter, where $1 \leq i < j \leq N$; way 2: when the transmitter receives an NACK message, the transmission power of the reference signal corresponding to the $i^{th}$ repetitive transmission by the transmitter is greater than the transmission power of the reference signal corresponding to the $i^{th}$ repetitive transmission by the transmitter, where $1 \leq i \leq j \leq N$; and, way 3: if the receiver receives an ACK message, the subsequent repetitive transmission is terminated. For example, after the transmitter receives an ACK message after a $k^{th}$ repetitive transmission, a $(k+1)^{th}$ to $N^{th}$ repetitive transmissions will not be executed.

In addition, in the embodiment of the present disclosure, the repetitive transmissions may be transmissions in different slots or sub slots by a network-side equipment (e.g., a base station), or may be transmissions in different slots or sub slots by multiple pieces of network-side equipment in a time division multiplexing manner, or transmissions in different slots or sub slots by a plurality of panels of one network-side equipment in a time division multiplexing manner. Further, the repetitive transmissions may also be transmissions by at least one panel of at least one network-side equipment in a space division multiplexing or frequency division multiplexing manner.

Figure 2:
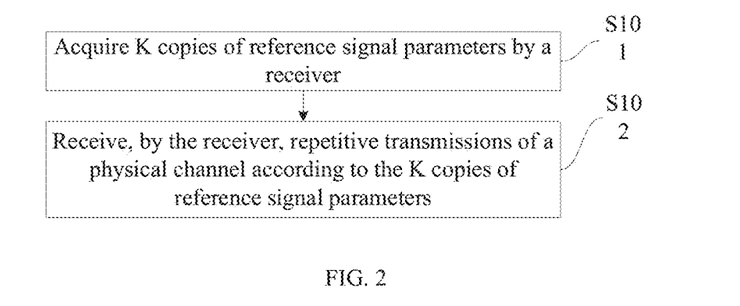
FIG. 2 is a flowchart of another physical channel transmission method according to an embodiment.

FIG. 2 shows a flowchart of another physical channel transmission method according to an embodiment of the present disclosure. As shown in FIG. 2, the method may be applied to a receiver and may include steps S201 to S202.

At S201, a receiver acquires K copies of reference signal parameters.

The K copies of reference signal parameters can be used for receiving N repetitive transmissions of a physical channel, where K and N are integers greater than 1, and N is greater than or equal to K. The reference signal parameters may include at least one of the number of resource elements of the reference signal, a density of the reference signal, the number of symbols of the reference signal and a transmission power of the reference signal. Further, the configuration of the reference signal parameters may also include a pattern of the reference signal, a power offset of the reference signal, a transmission type of the PUSCH, whether frequency hopping occurs in the PUSCH, a transmission type of the PUCCH, whether frequency hopping occurs in the PUCCH or the like. The pattern of the reference signal may include the number of REs occupied by the reference signal in one RB, the number of combs, the density of REs or the like. The transmission power or power offset is an increase relative to the data, SSB/PBCH, Channel State Information-Reference Signal (CSI-RS).

The N repetitive transmissions may be divided into K groups, and each group of repetitive transmissions uses the same reference signal parameters, for example, including n1 repetitive transmissions having consecutive repetitive transmission indexes. Here, n1 is a positive integer. For example, $n1=f(N/K)$, where f represents up-rounding or down-rounding of a real number, and N/K represents the division of N by K. If N is not divisible by K, when f is up-rounding, some groups of repetitive transmissions may include n1−1 repetitive transmissions; and when f is down-rounding, some groups of repetitive transmissions may include n1+1 repetitive transmissions. An $i^{th}$ group of repetitive transmissions corresponds to an $i^{th}$ copy of reference signal parameters, where $i=1, \ldots, K$.

The K copies of reference signal parameters correspond to M pieces of spatial parameter information, and/or the N repetitive transmissions of the physical channel correspond to M pieces of spatial parameter information, where M is a positive integer greater than or equal to K but less than or equal to N. In an embodiment, M spatial parameters may be divided into K groups, and each group of spatial parameters corresponds to one copy of reference signal parameters. That is, each group of spatial parameters is associated with one copy of reference signal parameters. For example, the $i^{th}$ group of spatial parameters is associated with the $i^{th}$ copy of reference signal parameters. The physical channel performing transmission by utilizing the $i^{th}$ group of spatial parameters repetitively transmits a reference signal of configuration of the corresponding $i^{th}$ copy of reference signal parameters. Each group of spatial parameter information includes n2 pieces of spatial parameter information. Here, n2 is a positive integer. For example, $n2=f(M/K)$, where f represents up-rounding or down-rounding of a real number, and M/K represents the division of M by K. If M is not divisible by K, when f is up-rounding, some groups of repetitive transmissions may include n2−1 repetitive transmissions; and when f is down-rounding, some groups of repetitive transmissions may include n2+1 repetitive transmissions.

At this step, the K copies of reference signal parameters acquired by the receiver may be parameters preconfigured by the receiver, or parameters acquired by the receiver through a high-layer signaling. The K copies of reference signal parameters preconfigured by the receiver may be construed as K copies of reference signal parameters configured by agreement between the transmitter and the receiver. The parameters acquired by the receiver through a high-layer signaling may be construed as K copies of reference signal parameters configured by the receiver through a high-layer signaling or K copies of reference signal parameters transmitted by other nodes and received through a high-layer signaling or physical layer signaling.

The receiver may preconfigure some reference signal parameters in the K copies of reference signal parameters. For example, it is assumed that k copies of reference signal parameters are preconfigured by the receiver and the other K−k copies of reference signal parameters are acquired through a high-layer signaling. For example, k copies of reference signal parameters are acquired by agreement according to k=1 copy of reference signal parameters, and the other K−k copies of reference signal parameter configurations are acquired in such a manner that the number of symbols of the reference signal may be gradually increased. A symbol index position of the reference signal with increased number of symbols may also be acquired by pre-configuration.

At S202, the receiver receives repetition transmissions of the physical channel according to the K copies of reference signal parameters.

After the receiver acquires the K copies of reference signal parameters, since the K copies of reference signal parameters are used for N repetitive transmissions of the physical channel, when the receiver receives a $j^{th}$ repetitive transmission transmitted by the transmitter in the process of receiving N repetitive transmissions, optionally, the information obtained by repetitive transmissions in a quantity that is less than or equal to j may be combined to obtain a combined gain.

In an example, the repetitive transmission way at S102 may be at least one of the following implementation ways: way 1: the number of symbols of the reference signal corresponding to the $i^{th}$ repetitive transmission received by the receiver is greater than or equal to the number of symbols of the reference signal corresponding to the received $i^{th}$ repetitive transmission, where $1 \le i < j \le N$; way 2: the transmission power of the reference signal corresponding to the $j^{th}$ repetitive transmission received by the receiver is greater than or equal to the transmission power of the reference signal corresponding to the received $i^{th}$ repetitive transmission, where $1 \le i < j \le N$; way 3: the number of resource elements of the reference signal corresponding to the $j^{th}$ repetitive transmission received by the receiver is greater than or equal to the number of resource elements of the reference signal corresponding to the received $i^{th}$ repetitive transmission, where $1 \le i < j \le N$; and, way 4: the density of the reference signal corresponding to the $j^{th}$ repetitive transmission received by the receiver is greater than or equal to the density of the reference signal corresponding to the received $i^{th}$ repetitive transmission, where $1 \le i < j \le N$.

The way of receiving repetitive transmissions at S202 may further include at least one of the following situations: situation 1: when the number of resource symbols corresponding to repetitive transmissions received by the receiver is greater than L, the number of symbols of the reference signal corresponding to the $j^{th}$ repetitive transmission received by the receiver is greater than or equal to the number of symbols of the reference signal corresponding to the received $i^{th}$ repetitive transmission, where L is an integer greater than 1 and $1 \le i < j \le N$; situation 2: after the receiver receives an $n^{th}$ repetitive transmission, the transmission power of the reference signal corresponding to the $j^{th}$ repetitive transmission received by the receiver is greater than or equal to the transmission power of the reference signal corresponding to the received $i^{th}$ repetitive transmission, where $1 < n \le j$ and $1 \le i < j \le N$; and, situation 3: after an $m^{th}$ repetitive transmission is received successfully by the receiver, the repetitive transmission is terminated, where m is greater than k, and $1 < k < N$. That is, after a certain repetitive transmission is received successfully by the receiver, and when the number of this repetitive transmission does not reach a total number of repetitive transmissions, the repetitive transmission may be terminated.

When the physical channel is a PDSCH or a PUSCH, and when the number of resource symbols corresponding to repetitive transmissions received by the receiver is greater than L, the value of L may be an integer greater than 7. Further, when the transmission type of the PDSCH is A, the value of L may be 8; and, when the transmission type of the PDSCH is B, the value of L may be 7. When no frequency hopping occurs and if the transmission type of the PUSCH is A, the value of L may be 8; or otherwise, the value of L is 7. When frequency hopping occurs, the value of K is 5. When the physical channel is a PUCCH, and when the number of resource symbols corresponding to repetitive transmissions received by the receiver is greater than L, the value of L may be an integer greater than 2.

In another embodiment, at S102, the receiving, by the receiver, repetitive transmissions of the physical channel according to the K copies of reference signal parameters may be the case where the number of symbols of the reference signal corresponding to the $i^{th}$ repetitive transmission received by the receiver is less than the number of symbols of the reference signal corresponding to the received $i^{th}$ repetitive transmission, where $1 \le i < j \le N$; or, when the number of resource symbols corresponding to repetitive transmissions received by the receiver is greater than L, the number of symbols of the reference signal corresponding to the $j^{th}$ repetitive transmission received by the receiver is less than the number of symbols of the reference signal corresponding to the received $i^{th}$ repetitive transmission, where L is an integer greater than 1 and $1 \le i < j \le N$; or, the number of resource elements of the reference signal corresponding to the $i^{th}$ repetitive transmission received by the receiver is less than the number of resource elements of the reference signal corresponding to the received $i^{th}$ repetitive transmission, where $1 \le i < j \le N$; or, the density of the reference signal corresponding to the $j^{th}$ repetitive transmission received by the receiver is less than the density of the reference signal corresponding to the received $i^{th}$ repetitive transmission, where $1 \le i < j \le N$.

Thus, by continuously reducing the overhead for modulation of the reference signal, a coding rate of the channel is increased, and the accuracy of demodulation is improved.

In another example, when the physical channel is a physical shared channel, at S202, the receiving, by the receiver, repetitive transmissions of the physical channel may be at least one of the following ways.

Way I: a modulation coding order corresponding to the shared data corresponding to the $j^{th}$ repetitive transmission received by the receiver is greater than a modulation coding order corresponding to the shared data corresponding to the received $i^{th}$ repetitive transmission, where $1 \le i < j \le N$.

Way II: when the receiver feeds back a negative acknowledgement message to the transmitter, the transmission power of the reference signal corresponding to the received $j^{th}$ repetitive transmission is greater than the transmission power of the reference signal corresponding to the received $i^{th}$ repetitive transmission, where $1 \le i < j \le N$.

When the physical channel is a PUSCH, if the receiver allocates resources for repetitive transmissions to the transmitter, the transmission power of the reference signal corresponding to the received $i^{th}$ repetitive transmission is greater than the transmission power of the reference signal corresponding to the received $i^{th}$ repetitive transmission, where $1 \le i < j \le N$.

Way III: if the receiver feeds back an ACK message to the transmitter or does not allocate resources for repetitive transmissions to the transmitter after the receiver successfully demodulates the PUSCH, the receiver will not receive subsequent repetitive transmissions of the PUSCH.

Way IV: when the physical channel is a PUSCH, if the receiver stops allocating resources for repetitive transmissions to the transmitter, the subsequent reception of repetitive transmissions is terminated. For example, if the receiver stops allocating resources for repetitive transmissions to the transmitter after a $k^{th}$ repetitive transmission, a $(k+1)^{th}$ to $N^{th}$ repetitive transmissions will not be executed.

In addition, in the embodiment of the present disclosure, the repetitive transmissions may be transmissions in different slots or sub slots by a network-side equipment, or may be transmissions in different slots or sub slots by multiple pieces of network-side equipment in a time division multiplexing manner, or transmissions in different slots or sub slots by a plurality of panels of one network-side equipment in a time division multiplexing manner. Further, the repetitive transmissions may also be transmissions by at least one panel of at least one network-side equipment in a space division multiplexing or frequency division multiplexing manner.

Figure 3:
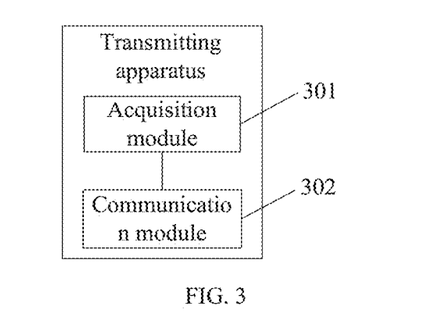
FIG. 3 is a schematic structural diagram of a transmitting apparatus according to an embodiment.

FIG. 3 shows a transmitting apparatus according to an embodiment of the present disclosure. As shown in FIG. 3, the apparatus includes: an acquisition module 301 and a communication module 302.

The acquisition module is configured to acquire K copies of reference signal parameters, the K copies of reference signal parameters being used for N repetitive transmissions of a physical channel, where K and N are integers greater than 1 and N is greater than or equal to K.

The N repetitive transmissions include K groups of repetitive transmissions, wherein each of the K groups of repetitive transmissions uses the same reference signal parameters, and an $i^{th}$ copy of reference signal parameters is used for an $i^{th}$ group of repetitive transmissions, where the value of i is any integer from 1 to K.

The reference signal parameters include at least one of the number of resource elements of the reference signal, a density of the reference signal, the number of symbols of the reference signal and a transmission power of the reference signal.

The apparatus further includes a configuration module configured to preconfigure the K copies of reference signal parameters. In addition, the K copies of reference signal parameters may also be parameters acquired by the apparatus through a high-layer signaling. The K copies of reference signal parameters correspond to M pieces of spatial parameter information, and/or the N repetitive transmissions of the physical channel correspond to M pieces of spatial parameter information, where M is a positive integer greater than or equal to K but less than or equal to N.

The M pieces of spatial parameter information may be divided into K groups, and an $i^{th}$ group of spatial parameter information corresponds to the $i^{th}$ copy of reference signal parameters.

The communication module is configured to perform repetition transmissions of the physical channel according to the K copies of reference signal parameters.

In an example, the communication module is configured to execute in at least one of the following implementation ways: way 1: the number of symbols of the reference signal corresponding to a $j^{th}$ repetitive transmission is greater than or equal to the number of symbols of the reference signal corresponding to an $i^{th}$ repetitive transmission, where $1 \le i < j \le N$; way 2: a transmission power of the reference signal corresponding to the $i^{th}$ repetitive transmission is greater than or equal to a transmission power of the reference signal corresponding to the $i^{th}$ repetitive transmission, where $1 \le i < j \le N$; way 3: the number of resource elements of the reference signal corresponding to the $j^{th}$ repetitive transmission is greater than or equal to the number of resource elements of the reference signal corresponding to the $i^{th}$ repetitive transmission, where $1 \le i < j \le N$; and, way 4: a density of the reference signal corresponding to the $i^{th}$ repetitive transmission is greater than or equal to a density of the reference signal corresponding to the $i^{th}$ repetitive transmission, where $1 \le i < j \le N$.

The communication module may further be configured to perform transmission in the following situations: situation 1: when the number of resource symbols corresponding to repetitive transmissions is greater than L, the number of symbols of the reference signal corresponding to the $j^{th}$ repetitive transmission is greater than or equal to the number of symbols of the reference signal corresponding to the $i^{th}$ repetitive transmission, where L is an integer greater than 1 and $1 \le i < j \le N$; situation 2: after an $n^{th}$ repetitive transmission, the transmission power of the reference signal corresponding to the $i^{th}$ repetitive transmission is greater than or equal to the transmission power of the reference signal corresponding to the $i^{th}$ repetitive transmission, where $1 < n$; and, situation 3: after an $m^{th}$ repetitive transmission is successful, the repetitive transmission is terminated, where m is greater than k, and $1 < k < N$.

In an example, the communication module is configured to execute in the following way: the number of symbols of the reference signal corresponding to the $j^{th}$ repetitive transmission is less than the number of symbols of the reference signal corresponding to the $i^{th}$ repetitive transmission, where $1 \le i < j \le N$; or, when the number of resource symbols corresponding to repetitive transmissions is greater than L, the number of symbols of the reference signal corresponding to the $i^{th}$ repetitive transmission is less than the number of symbols of the reference signal corresponding to the $i^{th}$ repetitive transmission, where L is an integer greater than 1 and $1 \le i < j \le N$; or, the number of resource elements of the reference signal corresponding to the $i^{th}$ repetitive transmission is less than the number of resource elements of the reference signal corresponding to the $i^{th}$ repetitive transmission, where $1 \le i < j \le N$; or, the density of the reference signal corresponding to the $j^{th}$ repetitive transmission is less than the density of the reference signal corresponding to the $i^{th}$ repetitive transmission, where $1 \le i < j \le N$.

In an example, when the physical channel is a physical shared channel, the communication module can also be configured to implement at least one of the following two ways: the modulation coding order corresponding to the shared data corresponding to the $j^{th}$ repetitive transmission is greater than the modulation coding order corresponding to the shared data corresponding to the $i^{th}$ repetitive transmission, where $1 \le i < j \le N$; and, when the communication module receives a negative acknowledgement message, the transmission power of the reference signal corresponding to the $j^{th}$ repetitive transmission is greater than the transmission power of the reference signal corresponding to the $i^{th}$ repetitive transmission, where $1 \le i < j \le N$.

Figure 4:
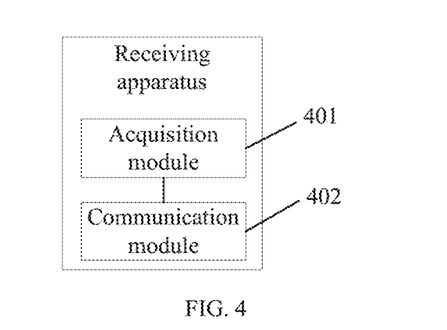
FIG. 4 is a schematic structural diagram of a receiving apparatus according to an embodiment.

FIG. 4 shows a receiving apparatus according to an embodiment of the present disclosure. As shown in FIG. 4, the apparatus includes: an acquisition module 401 and a communication module 402.

The acquisition module is configured to acquire K copies of reference signal parameters, the K copies of reference signal parameters being used for receiving N repetitive transmissions of a physical channel, where K and N are integers greater than 1 and N is greater than or equal to K.

The N repetitive transmissions include K groups of repetitive transmissions, wherein each of the K groups of repetitive transmissions uses the same reference signal parameters, and the $i^{th}$ copy of reference signal parameters is used for the $i^{th}$ group of repetitive transmissions, where the value of i is any integer from 1 to K.

The reference signal parameters include at least one of the number of resource elements of the reference signal, a density of the reference signal, the number of symbols of the reference signal and a transmission power of the reference signal.

The apparatus further includes: a configuration module configured to preconfigure the K copies of reference signal parameters. In addition, the K copies of reference signal parameters may also be parameters acquired by the apparatus through a high-layer signaling. The K copies of reference signal parameters correspond to M pieces of spatial parameter information, and/or the N repetitive transmissions of the physical channel correspond to M pieces of spatial parameter information, where M is a positive integer greater than or equal to K but less than or equal to N.

The M pieces of spatial parameter information can be divided into K groups, and the $i^{th}$ group of spatial parameter information corresponds to the $i^{th}$ copy of reference signal parameters.

The communication module is configured to receive repetition transmissions of the physical channel according to the K copies of reference signal parameters.

In an example, the communication module is configured to execute in at least one of the following implementation ways: way 1: the number of symbols of the reference signal corresponding to the received $j^{th}$ repetitive transmission is greater than or equal to the number of symbols of the reference signal corresponding to the received $i^{th}$ repetitive transmission, where $1 \leq i < j \leq N$; way 2: the transmission power of the reference signal corresponding to the received $j^{th}$ repetitive transmission is greater than or equal to the transmission power of the reference signal corresponding to the received $i^{th}$ repetitive transmission, where $1 \leq i < j \leq N$; way 3: the number of resource elements of the reference signal corresponding to the received $j^{th}$ repetitive transmission is greater than or equal to the number of resource elements of the reference signal corresponding to the received $i^{th}$ repetitive transmission, where $1 \leq i < j \leq N$; and, way 4: the density of the reference signal corresponding to the received $j^{th}$ repetitive transmission is greater than or equal to the density of the reference signal corresponding to the received $i^{th}$ repetitive transmission, where $1 \leq i < j \leq N$.

The communication module may also be configured to perform transmission in the following situations: situation 1: when the number of resource symbols corresponding to the received repetitive transmissions is greater than L, the number of symbols of the reference signal corresponding to the received $j^{th}$ repetitive transmission is greater than or equal to the number of symbols of the reference signal corresponding to the received $i^{th}$ repetitive transmission, where L is an integer greater than 1 and $1 \leq i < j \leq N$; situation 2: after an $n^{th}$ repetitive transmission is received, the transmission power of the reference signal corresponding to the received $i^{th}$ repetitive transmission is greater than or equal to the transmission power of the reference signal corresponding to the received $i^{th}$ repetitive transmission, where $1 < n \leq j$ and $1 \leq i < j \leq N$; and, situation 3: after an $m^{th}$ repetitive transmission is received successfully, the repetitive transmission is terminated, where m is greater than k, and $1 < k < N$.

In an example, the communication module may perform transmission in the following way: the number of symbols of the reference signal corresponding to the received $j^{th}$ repetitive transmission is less than the number of symbols of the reference signal corresponding to the received $i^{th}$ repetitive transmission, where $1 \leq i < j \leq N$; or, when the number of resource symbols corresponding to the received repetitive transmissions is greater than L, the number of symbols of the reference signal corresponding to the received $i^{th}$ repetitive transmission is less than the number of symbols of the reference signal corresponding to the received $i^{th}$ repetitive transmission, where L is an integer greater than 1 and $1 \leq i < j \leq N$; or, the number of resource elements of the reference signal corresponding to the received $j^{th}$ repetitive transmission is less than the number of resource elements of the reference signal corresponding to the received $i^{th}$ repetitive transmission, where $1 \leq i < j \leq N$; or, the density of the reference signal corresponding to the received $j^{th}$ repetitive transmission is less than the density of the reference signal corresponding to the received $i^{th}$ repetitive transmission, where $1 \leq i < j \leq N$.

In an example, when the physical channel is a physical shared channel, the communication module is further configured to implement at least one of the following two optional implementation ways: way 1: a modulation coding order corresponding to the shared data corresponding to the received $i^{th}$ repetitive transmission is greater than a modulation coding order corresponding to the shared data corresponding to the received $i^{th}$ repetitive transmission, where $1 \leq i < j \leq N$; and, way 2: when the communication module feeds back a negative acknowledgement message, the transmission power of the reference signal corresponding to the received $j^{th}$ repetitive transmission is greater than the transmission power of the reference signal corresponding to the received $i^{th}$ repetitive transmission, where $1 \leq i < j \leq N$.

Figure 5:
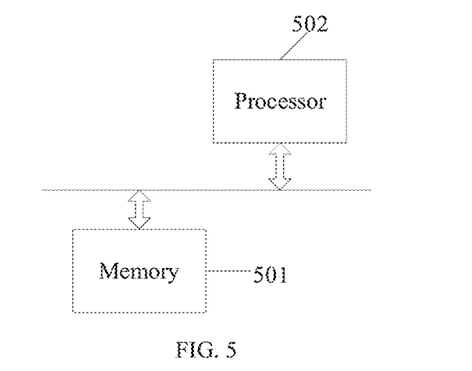
FIG. 5 is a schematic structural diagram of a node according to an embodiment.

FIG. 5 is a schematic structural diagram of a node according to an embodiment. As shown in FIG. 5, the node includes a processor 501 and a memory 502. The node may have one or more processors 501. FIG. 5 is illustrated by taking one processor 501 as an example. The processor 501 and the memory 502 in the node may be connected via a bus or in other ways. FIG. 5 is illustrated by taking the processor and the memory being connected via a bus as an example. As a computer-readable storage medium, the memory 502 may be configured to store software programs, computer-executable programs and modules, for example, program instructions/modules corresponding to the signaling processing method in FIG. 1 of the present disclosure (for example, the acquisition module 301 and the communication module 302 in the transmitting apparatus). The processor 501 is configured to execute the software programs, instructions and modules stored in the memory 502 to carry out the physical channel transmission method described above.

The memory 502 may mainly include a program storage region and a data storage region. The program storage region may store application programs required by an operating system and at least one function. The data storage region may store data created according to the use of the device, etc. In addition, the memory 502 may include high-speed random access memories, or non-volatile memories, for example, at least one magnetic disk memory device, flash memory devices or other non-volatile solid-state memory devices.

Figure 6:
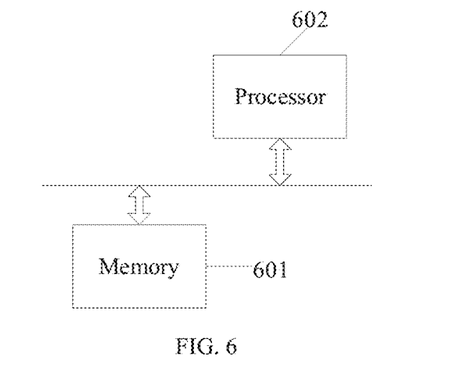
FIG. 6 is a schematic structural diagram of a node according to an embodiment.

FIG. 6 is a schematic structural diagram of a node according to an embodiment. As shown in FIG. 6, the node includes a processor 601 and a memory 602. The node may have one or more processors 601. FIG. 6 is illustrated by taking one processor 601 as an example. The processor 601 and the memory 602 in the node may be connected via a bus or in other ways. FIG. 6 is illustrated by taking the processor and the memory being connected via a bus as an example.

As a computer-readable storage medium, the memory 602 may be configured to store software programs, computer-executable programs and modules, for example, program instructions/modules corresponding to the signaling processing method in FIG. 2 of the present disclosure (for example, the acquisition module 401 and the communication module 402 in the receiving apparatus). The processor 601 is configured to execute the software programs, instructions and modules stored in the memory 602 to carry out the physical channel transmission method described above.

The memory 602 may mainly include a program storage region and a data storage region. The program storage region may store application programs required by an operating system and at least one function. The data storage region may store data created according to the use of the device, etc. In addition, the memory 602 may include high-speed random access memories, or non-volatile memories, for example, at least one magnetic disk memory device, flash memory devices or other non-volatile solid-state memory devices.

An embodiment of the present disclosure further provides a non-transitory storage medium containing computer-executable instructions which, when executed by a computer processor, cause the processor to carry out a physical channel transmission method. The method includes steps of: acquiring K copies of reference signal parameters by a transmitter, the K copies of reference signal parameters being used for N repetitive transmissions of a physical channel, where the K and N are integers greater than 1 and the N is greater than or equal to K; and, performing, by the transmitter, repetitive transmissions of the physical channel according to the K copies of reference signal parameters.

An embodiment of the present disclosure further provides a non-transitory storage medium containing computer-executable instructions which, when executed by a computer processor, cause the processor to carry out a physical channel transmission method. The method includes steps of: acquiring, by a receiver, K copies of reference signal parameters, the K copies of reference signal parameters being used for receiving N repetitive transmissions of a physical channel, where the K and N are integers greater than 1 and the N is greater than or equal to K; and, receiving, by the receiver, repetitive transmissions of the physical channel according to the K copies of reference signal parameters.

The foregoing description merely shows the exemplary embodiments of the present disclosure, and is not intended to limit the protection scope of the present disclosure.

It should be understood by those having ordinary skills in the art that the term "receiver" encompasses any suitable type of wireless user equipment, for example, mobile phones, portable data processing apparatuses, portable web browsers or vehicle-mounted mobile stations.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing apparatuses, although the present disclosure is not limited thereto.

The embodiments of the present disclosure may be implemented by executing computer program instructions by a data processor of a physical channel transmission apparatus, for example, in processor entities, or by hardware, or by a combination of software and hardware. The computer program instructions may be assembly instructions, Instruction Set Architecture (ISA) instructions, machine instructions, machine-related instructions, microcodes, firmware instructions, state setting data, or source codes or target codes written in any combination of one or more programming languages.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read-only memories (ROMs), random access memories (RAMs), optical memory devices and systems (digital video discs (DVDs) or compact disks (CDs)), etc. The computer-readable medium may include non-transitory storage mediums. The data processor may be of any type suitable for the local technical environment, for example, but not limited to, general purpose computers, special purpose computers, microprocessors, digital signal processors (DSPs), application specific integrated circuits (ASICs), field programmable gate arrays (FGPAs), and processors based on a multicore processor architecture.

The invention claimed is:

1. A physical channel transmission method, comprising:
   acquiring, by a transmitter, K sets of reference signal parameters, the K sets of reference signal parameters being used for N repetitive transmissions of a physical channel;
   where the K and N are integers greater than 1 and the N is greater than or equal to K; and
   performing, by the transmitter, repetitive transmissions of the physical channel according to the K sets of reference signal parameters;
   wherein at least one of the reference signal parameters corresponding to a $j^{th}$ repetitive transmission by the transmitter is different from at least one of the reference signal parameters corresponding to an $i^{th}$ repetitive transmission by the transmitter, the j is greater than the i, the i is greater than or equal to 1, and the j is less than or equal to N.

2. The method of claim 1, wherein the reference signal parameters comprise at least one of: a number of resource elements of a reference signal, a density of the reference signal, a number of symbols of the reference signal, and a transmission power of the reference signal.

3. The method of claim 1, wherein the K sets of reference signal parameters are parameters preconfigured by the transmitter, or the K sets of reference signal parameters are parameters acquired by the transmitter through a high-layer signaling.

4. The method of claim 3, wherein the K sets of reference signal parameters correspond to M pieces of spatial parameter information, or the N repetitive transmissions of the physical channel correspond to M pieces of spatial parameter information, or the K sets of reference signal parameters correspond to M pieces of spatial parameter information and the N repetitive transmissions of the physical channel correspond to M pieces of spatial parameter information, the M being an integer greater than or equal to K but less than or equal to N.

5. The method of claim 4, wherein the M pieces of spatial parameter information are divided into K groups, and an $i^{th}$ group of spatial parameter information corresponds to an $i^{th}$ set of reference signal parameters, and the value of i is any integer from 1 to K.

6. The method of claim 1, wherein the N repetitive transmissions comprise K groups of repetitive transmissions, and for each group of repetitive transmissions of the K groups of repetitive transmissions the same reference signal parameters are used.

7. The method of claim 1, wherein the performing, by the transmitter, repetitive transmissions of the physical channel according to the K sets of reference signal parameters comprises at least one of:
   the number of symbols of the reference signal corresponding to a $j^{th}$ repetitive transmission by the transmitter is greater than the number of symbols of the reference signal corresponding to an $i^{th}$ repetitive transmission by the transmitter;

a transmission power of the reference signal corresponding to the $j^{th}$ repetitive transmission by the transmitter is greater than a transmission power of the reference signal corresponding to the $i^{th}$ repetitive transmission by the transmitter;

the number of resource elements of the reference signal corresponding to the $j^{th}$ repetitive transmission by the transmitter is greater than the number of resource elements of the reference signal corresponding to the $i^{th}$ repetitive transmission by the transmitter; and a density of the reference signal corresponding to the $j^{th}$ repetitive transmission by the transmitter is greater than a density of the reference signal corresponding to the $i^{th}$ repetitive transmission by the transmitter;

wherein the j is greater than the i, the i is greater than or equal to 1, and the j is less than or equal to N.

8. The method of claim 7, wherein the performing, by the transmitter, repetitive transmissions of the physical channel according to the K sets of reference signal parameters further comprises at least one of:

in response to the number of resource symbols corresponding to repetitive transmissions being greater than L, the number of symbols of the reference signal corresponding to the $j^{th}$ repetitive transmission by the transmitter is greater than the number of symbols of the reference signal corresponding to the $i^{th}$ repetitive transmission by the transmitter;

after an $n^{th}$ repetitive transmission, the transmission power of the reference signal corresponding to the $j^{th}$ repetitive transmission by the transmitter is greater than the transmission power of the reference signal corresponding to the $i^{th}$ repetitive transmission by the transmitter; and after an $m^{th}$ repetitive transmission by the transmitter is successful, the repetitive transmission is terminated, the m being greater than k and less than the N;

wherein the j is greater than the i; the i is greater than or equal to 1; the j is less than or equal to N; the N is an integer greater than 1; the n and the L are integers greater than 1; the j is greater than or equal to the n; and the k is greater than 1 and less than the N.

9. The method of claim 7, wherein, in response to the physical channel being a physical shared channel, the performing, by the transmitter, repetitive transmissions of the physical channel according to the K sets of reference signal parameters further comprises at least one of:

a modulation coding order corresponding to shared data corresponding to the $j^{th}$ repetitive transmission by the transmitter is greater than a modulation coding order corresponding to shared data corresponding to the $i^{th}$ repetitive transmission by the transmitter; and in response to the transmitter receiving a negative acknowledgement message, the transmission power of the reference signal corresponding to the $j^{th}$ repetitive transmission by the transmitter is greater than the transmission power of the reference signal corresponding to the $i^{th}$ repetitive transmission by the transmitter;

wherein the j is greater than the i, the i is greater than or equal to 1, the j is less than or equal to N, and the N is an integer greater than 1.

10. The method of claim 1, wherein the performing, by the transmitter, repetitive transmissions of the physical channel according to the K sets of reference signal parameters comprises at least one of:

the number of symbols of the reference signal corresponding to the $j^{th}$ repetitive transmission by the transmitter is less than the number of symbols of the reference signal corresponding to the $i^{th}$ repetitive transmission by the transmitter;

in response to the number of resource symbols corresponding to repetitive transmissions being greater than L, the number of symbols of the reference signal corresponding to the $j^{th}$ repetitive transmission by the transmitter is less than the number of symbols of the reference signal corresponding to the $i^{th}$ repetitive transmission by the transmitter;

the number of resource elements of the reference signal corresponding to the $j^{th}$ repetitive transmission by the transmitter is less than the number of resource elements of the reference signal corresponding to the $i^{th}$ repetitive transmission by the transmitter; and the density of the reference signal corresponding to the $j^{th}$ repetitive transmission by the transmitter is less than the density of the reference signal corresponding to the $i^{th}$ repetitive transmission by the transmitter;

wherein the j is greater than the i, the i greater than or equal to 1, the j is less than or equal to N, the N is an integer greater than 1, and the L is an integer greater than 1.

11. A physical channel transmission method, comprising:

acquiring K sets of reference signal parameters by a receiver, the K sets of reference signal parameters being used for receiving N repetitive transmissions of a physical channel;

wherein the K and N are integers greater than 1 and the N is greater than or equal to K; and receiving, by the receiver, repetitive transmissions of the physical channel according to the K sets of reference signal parameters;

wherein at least one of the reference signal parameters corresponding to a $j^{th}$ repetitive transmission received by the receiver is different from at least one of the reference signal parameters corresponding to an $i^{th}$ repetitive transmission received by the receiver, the j is greater than the i, the i is greater than or equal to 1, and the j is less than or equal to N.

12. The method of claim 11, wherein the reference signal parameters comprise at least one of: a number of resource elements of a reference signal, a density of the reference signal, a number of symbols of the reference signal, and a transmission power of the reference signal.

13. The method of claim 11, wherein the K sets of reference signal parameters are parameters preconfigured by the receiver, or the K sets of reference signal parameters are parameters acquired by the receiver through a high-layer signaling.

14. The method of claim 13, wherein the K sets of reference signal parameters correspond to M pieces of spatial parameter information, or the N repetitive transmissions of the physical channel correspond to M pieces of spatial parameter information, or the K sets of reference signal parameters correspond to M pieces of spatial parameter information and the N repetitive transmissions of the physical channel correspond to M pieces of spatial parameter information, the M being an integer greater than or equal to K but less than or equal to N.

15. The method of claim 11, wherein the N repetitive transmissions comprise K groups of repetitive transmissions, and for each of the K groups of repetitive transmissions the same reference signal parameters are used.

16. The method of claim 11, wherein the receiving, by the receiver, repetitive transmissions of the physical channel according to the K sets of reference signal parameters comprises at least one of:

the number of symbols of the reference signal corresponding to a $j^{th}$ repetitive transmission received by the receiver is greater than the number of symbols of the reference signal corresponding to an $i^{th}$ repetitive transmission received by the receiver;

a transmission power of the reference signal corresponding to the $j^{th}$ repetitive transmission received by the receiver is greater than a transmission power of the reference signal corresponding to the $i^{th}$ repetitive transmission received by the receiver;

the number of resource elements of the reference signal corresponding to the $j^{th}$ repetitive transmission received by the receiver is greater than the number of resource elements of the reference signal corresponding to the $i^{th}$ repetitive transmission received by the receiver; and a density of the reference signal corresponding to the $j^{th}$ repetitive transmission received by the receiver is greater than a density of the reference signal corresponding to the $i^{th}$ repetitive transmission received by the receiver;

wherein the j is greater than the i, the i is greater than or equal to 1, and the j is less than or equal to N.

17. The method of claim 11, wherein the receiving, by the receiver, repetitive transmissions of the physical channel according to the K sets of reference signal parameters comprises:

the number of symbols of the reference signal corresponding to the $j^{th}$ repetitive transmission received by the receiver is less than the number of symbols of the reference signal corresponding to the $i^{th}$ repetitive transmission received by the receiver;

or, in response to the number of resource symbols corresponding to the received repetitive transmissions being greater than L, the number of symbols of the reference signal corresponding to the $j^{th}$ repetitive transmission received by the receiver is less than the number of symbols of the reference signal corresponding to the $i^{th}$ repetitive transmission received by the receiver;

or, the number of resource elements of the reference signal corresponding to the $j^{th}$ repetitive transmission received by the receiver is less than the number of resource elements of the reference signal corresponding to the $i^{th}$ repetitive transmission received by the receiver;

or, the density of the reference signal corresponding to the $j^{th}$ repetitive transmission received by the receiver is less than the density of the reference signal corresponding to the $i^{th}$ repetitive transmission received by the receiver;

wherein the j is greater than the i, and the L is an integer greater than 1.

18. A node, comprising: a memory, a processor and computer programs that are stored on the memory and executable by the processor, wherein the computer programs, when executed by the processor, cause the processor to carry out a physical channel transmission method, comprising:

acquiring, by a transmitter, K sets of reference signal parameters, the K sets of reference signal parameters being used for N repetitive transmissions of a physical channel;

where the K and N are integers greater than 1 and the N is greater than or equal to K; and performing, by the transmitter, repetitive transmissions of the physical channel according to the K sets of reference signal parameters;

wherein at least one of the reference signal parameters corresponding to a $j^{th}$ repetitive transmission by the transmitter is different from at least one of the reference signal parameters corresponding to an $i^{th}$ repetitive transmission by the transmitter, the j is greater than the i, the i is greater than or equal to 1, and the j is less than or equal to N; or to carry out a physical channel transmission method, comprising:

acquiring K sets of reference signal parameters by a receiver, the K sets of reference signal parameters being used for receiving N repetitive transmissions of a physical channel;

wherein the K and N are integers greater than 1 and the N is greater than or equal to K; and receiving, by the receiver, repetitive transmissions of the physical channel according to the K sets of reference signal parameters;

wherein at least one of the reference signal parameters corresponding to a $j^{th}$ repetitive transmission received by the receiver is different from at least one of the reference signal parameters corresponding to an $i^{th}$ repetitive transmission received by the receiver, the j is greater than the i, the i is greater than or equal to 1, and the j is less than or equal to N.

19. A non-transitory computer-readable storage medium having computer programs stored thereon which, when executed by a processor, cause the processor to carry out the physical channel transmission method of claim 1.

20. A non-transitory computer-readable storage medium having computer programs stored thereon which, when executed by a processor, cause the processor to carry out the physical channel transmission method of claim 11.

* * * * *